UNITED STATES PATENT OFFICE.

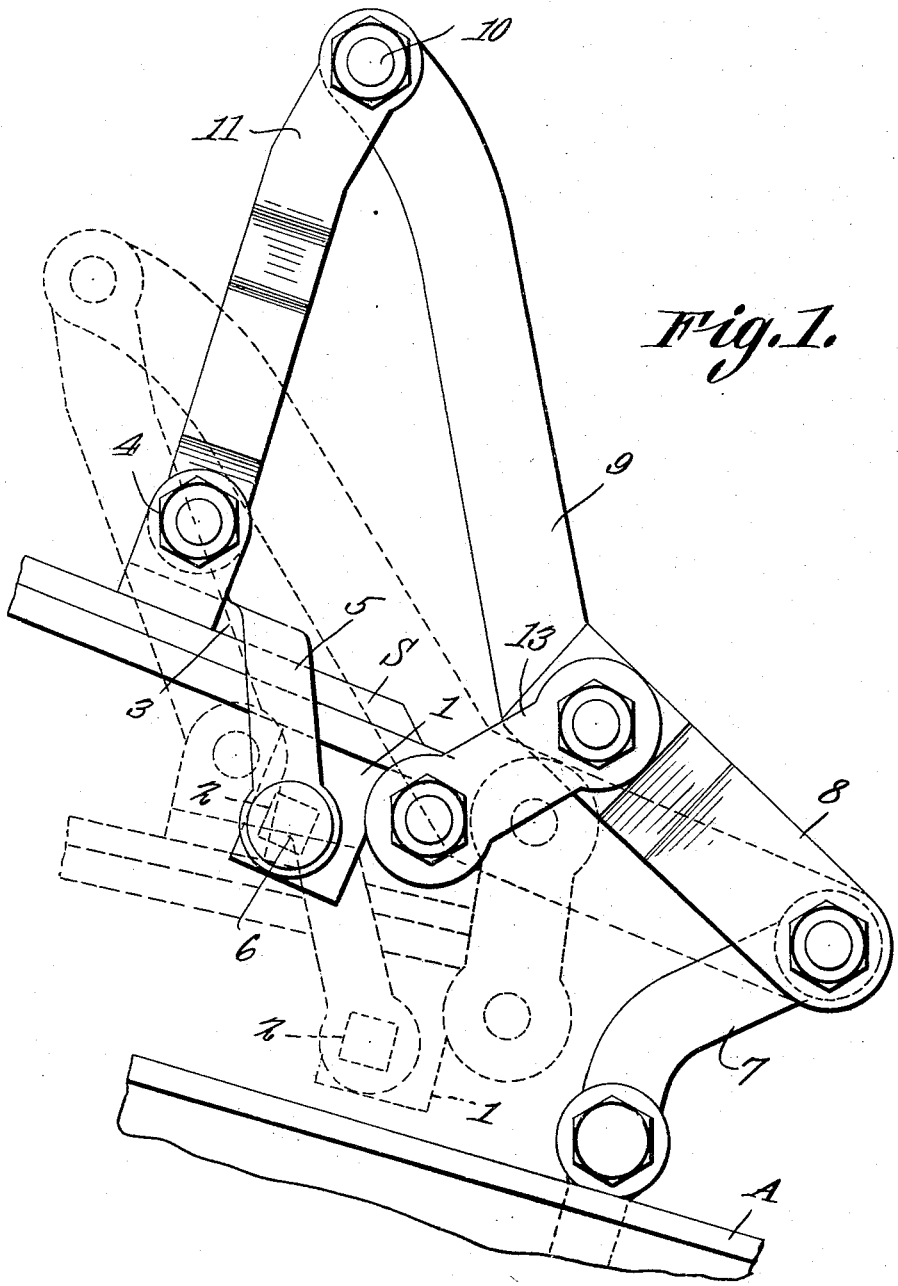

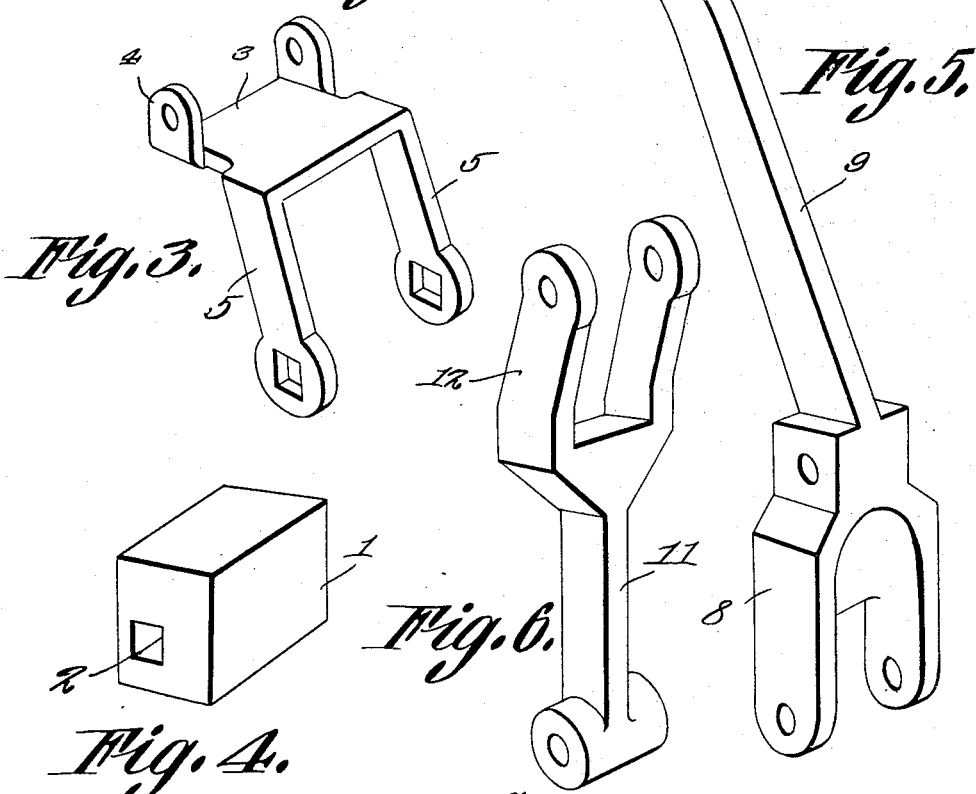

CHARLES A. HORNBURG, OF DEVINE, TEXAS.

SHOCK-ABSORBER.

1,205,994.   Specification of Letters Patent.   Patented Nov. 28, 1916.

Application filed April 24, 1916. Serial No. 93,349.

*To all whom it may concern:*

Be it known that I, CHARLES A. HORNBURG, a citizen of the United States, residing at Devine, in the county of Medina and State of Texas, have invented a new and useful Shock-Absorber, of which the following is a specification.

This invention relates to shock absorbers particularly designed for use in connection with the well known Ford automobile, although it is to be understood that the same can be employed in connection with other makes of automobiles having the same arrangement of springs as in the Ford machine.

One of the objects of the invention is to provide a shock absorber made up of but few parts, which can be applied readily to a machine, and which utilizes the vehicle springs as the sole shock absorbing means.

A further object is to provide a structure of this character which is compact and which will not detract from the appearance of a vehicle to which it is attached.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1 is a side elevation of a shock absorber embodying the present improvements, one of the positions of the device being illustrated by dotted lines. Fig. 2 is a plan view of the structure shown in Fig. 1. Fig. 3 is a perspective view of the adjustable spring engaging clip. Fig. 4 is a perspective view of the adjusting block used in connection therewith. Fig. 5 is a perspective view of the long lever of the device. Fig. 6 is a perspective view of the short lever.

Referring to the figures by characters of reference 1 designates a rectangular block having an angular opening 2 extending therethrough and located at different distances from the respective faces of the block. This block is designed to fit against the bottom of the laminated spring S of a vehicle and against the eye ordinarily provided at the end of the spring. A clip is mounted on the spring and includes a base plate 3 designed to bear on the spring, upstanding ears 4 at the sides of the base plate, and downwardly extending arms 5 designed to extend below the spring S and to engage the sides of the block 1. The block 1 can be adjusted angularly relative to the arms 5 and as the point of connection of block 1 with said arms is eccentrically disposed, it will be seen that by adjusting said block angularly, the arms 5 can be held at different distances from the eye on the spring. An angular bolt 6 is extended through the arms and block and serves to hold the block against rotation relative to the arms. Obviously with this form of adjustment the ears 4 can be held at any one of several distances from the end of the spring S.

The axle A has a perch 7 such as usually employed. This perch, however, instead of extending toward the end of the spring and having a hanger fastened to it as ordinarily, is extended downwardly away from the spring and is pivotally engaged by the forked lower end 8 of the long lever 9 of the device. The upper end of this long lever is pivotally connected as at 10 to a short lever 11 the lower end of which is extended between and pivotally connected to the ears 4. The upper end of the short lever is preferably forked as shown at 12 in Fig. 6. Hangers 13 are pivotally connected to the sides of the lever 9 and to the eye of spring S. It will be noted that the lower arm of the lever 9 is somewhat shorter than the upper arm and the two arms are disposed out of alinement, forming an obtuse angle.

The operation of the shock absorber is as follows:—When the car body moves suddenly in a downward direction the weight of said body and its contents serve to reduce the curvature in the spring S and thus thrusts the end of the spring toward the perch 7. As the clip 3 moves with the spring S, the lower end of lever 11 will also be moved downwardly in the general direction of the perch 7. Thus the lever 9 is caused to swing downwardly about its pivotal connection with the perch. Obviously as the downward pressure is increased the short lever 11 swings farther toward the perch 7, as indicated by dotted lines, so that an increasing pressure is transferred from the top of the spring to the end thereof, thus preventing the spring from weakening or breaking and causing a gradual retarding of the movement of the body in a downward direction. When the car body is moved upwardly or rebounds, the effect produced is opposite to that described. Consequently by employing a shock absorber such as described and illustrated an easy downward and upward swinging motion will be produced.

What is claimed is:—

1. The combination with a vehicle spring and a perch adjacent thereto, of a clip upon the spring, means for transmitting thrusts therefrom to the end of the spring, a lever pivotally connected to the perch, a connecting lever extending therefrom and to the clip, and a hanger connecting the first named lever to the end of the spring.

2. The combination with a vehicle spring and a perch adjacent thereto, of shock absorbing means including a clip mounted upon the spring adjacent one end thereof, a long lever pivotally connected to the perch and overhanging the spring, a short lever pivotally connecting said long lever to the clip, and a hanger connecting the long lever to the end of the spring.

3. The combination with a vehicle spring and a perch adjacent thereto, of shock absorbing means including a clip bearing upon and adjustably connected to the spring for transmitting thrusts against the end of the spring, pivotally connected levers, a pivotal connection between one of the levers and the clip, hangers connecting the other lever to the end of the spring, and a pivotal connection between said last named lever and the perch.

4. The combination with a vehicle spring and a perch adjacent thereto, of a clip bearing on the spring adjacent one end, arms depending therefrom at the sides of the spring, an angularly adjustable block carried by the arm for engaging the bottom and end of the spring, pivotally connected levers, a pivotal connection between one of the levers and the clip, hangers connecting the other lever to the end of the spring, and a pivotal connection between the last named lever and the perch.

In testimony that I claim the foregoing as my own, I have hereto affixed my signature in the presence of two witnesses.

CHARLES A. HORNBURG.

Witnesses:
J. T. KERCHEVILLE,
A. P. BARRETT.

Copies of this patent may be obtained for five cents each, by addressing the "Commissioner of Patents, Washington, D. C."